US012762248B2

(12) United States Patent
Aljurayyad et al.

(10) Patent No.: US 12,762,248 B2
(45) Date of Patent: Oct. 13, 2026

(54) SYSTEM AND METHOD CONFIGURED TO PERFORM PENETRATION TESTING OF VIRTUAL REALITY SYSTEMS USING MACHINE LEARNING

(71) Applicant: Saudi Arabian Oil Company, Dhahran (SA)

(72) Inventors: Abdulmalik Abdulaziz Aljurayyad, Dammam (SA); Mohammed Ahmad Ababtain, Khobar (SA); Khadeja Saad Almajid, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 156 days.

(21) Appl. No.: 18/767,319

(22) Filed: Jul. 9, 2024

(65) Prior Publication Data

US 2026/0017377 A1 Jan. 15, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2012/0017281 | A1* | 1/2012 | Banerjee | G06F 21/577 726/25 |
| 2018/0089437 | A1* | 3/2018 | Baset | G06F 21/577 |
| 2020/0117583 | A1* | 4/2020 | Durairaj | G06F 11/3692 |
| 2020/0265144 | A1* | 8/2020 | Gwilliams | H04L 67/025 |
| 2020/0356674 | A1* | 11/2020 | Nikolai | G06F 21/577 |
| 2021/0248242 | A1* | 8/2021 | Pathak | G06F 11/3692 |
| 2021/0357507 | A1* | 11/2021 | Sulatycki | G06F 9/541 |
| 2023/0031218 | A1* | 2/2023 | Mahdavipour | H04L 67/10 |
| 2024/0152623 | A1* | 5/2024 | Hulick, Jr. | G06F 21/577 |

OTHER PUBLICATIONS

Khronos Group "OpenXR 1.0 Specification, Section: xrGetSystemProperties", 2019. https://registry.khronos.org/OpenXR/specs/1.0/man/html/xrGetSystemProperties.html (Year: 2019).*

* cited by examiner

*Primary Examiner* — Kaveh Abrishamkar
(74) *Attorney, Agent, or Firm* — Leason Ellis LLP

(57) ABSTRACT

A system and method perform penetration testing of virtual reality (VR) systems using machine learning. A machine learning module receives VR system parameters of the VR system, identifies characteristics of the VR system from the VR system parameters thereby identifying the VR system, and performs a VR vendor-specific penetration test corresponding to the identified characteristics, thereby generating penetration test results associated with the VR system. A report generating module generates and outputs an assessment report of the VR system using the penetration test results. The method implements the system.

15 Claims, 6 Drawing Sheets

SYSTEM AND METHOD CONFIGURED TO PERFORM PENETRATION TESTING OF VIRTUAL REALITY SYSTEMS USING MACHINE LEARNING

FIELD OF THE DISCLOSURE

The present disclosure relates generally to penetration testing of computer systems, and, more particularly, to a system and method configured to perform penetration testing of virtual reality (VR) systems using machine learning (ML).

BACKGROUND OF THE DISCLOSURE

A penetration test, or "pentest" is a method performed to evaluate the security of a computer system, which includes hardware, software, or computer operations. During a penetration test, an authorized simulated cyberattack is performed on the computer system to identify weaknesses or vulnerabilities of the computer system, including the potential for unauthorized parties to gain access to the features and data of the computer system as well as to evaluate the strengths of the computer system. By using a penetration test, a full risk assessment of the computer system is attained, and so conducting a penetration test ensures the quality of the computer system under test.

Computer-based technologies are continuously developed, and so it is advisable to perform compatible penetration testing and assessment to secure these new technologies. One such computer-based technology is virtual reality (VR) systems and devices. Penetration testing of such VR systems and devices is often conducted manually by cybersecurity personnel, who perform specific test cases of the VR systems and devices based on the operating system and installed applications of the VR systems and devices. During such manual penetration testing, the cybersecurity personnel are required to physically wear the VR devices, such as a VR headset and VR gloves, in order to interact with the VR systems and devices under test. Besides any discomfort experienced by the cybersecurity personnel during the penetration testing, the process of preparing and setting up a VR device for penetration testing is time-consuming.

Alternatively, penetration testing activities and vulnerability assessment scanning is performed on an application before installing the application on a VR device or VR system. However, such testing and assessment does not reflect the configuration of the applications as installed on the VR device or VR system, and so such testing and assessment does not present a full risk assessment of the deployed applications.

SUMMARY OF THE DISCLOSURE

According to an implementation consistent with the present disclosure, a system and method are configured to perform penetration testing of VR systems using machine learning.

In an implementation, a computer-based system is configured to perform penetration testing on a virtual reality (VR) system. The computer-based system comprises a hardware-based processor, a memory, and a set of modules. The memory is configured to store instructions, and is connected to the hardware-based processor to provide the instructions to the hardware-based processor. The set of modules are configured to implement the instructions provided to the hardware-based processor. The set of modules includes a machine learning module and a report generating module. The machine learning module is configured to receive VR system parameters of the VR system, to identify characteristics of the VR system from the VR system parameters thereby identifying the VR system, and to perform a VR vendor-specific penetration test corresponding to the identified characteristics, thereby generating penetration test results associated with the VR system. The report generating module is configured to generate and output an assessment report of the VR system using the penetration test results.

The memory can store a plurality of predefined VR vendor-specific test cases, and the machine learning module can be trained to identify the characteristics of the VR system from the VR system parameters using the plurality of predefined VR vendor-specific test cases. The machine learning module can be configured to automatically identify characteristics of the VR system from the VR system parameters, and to automatically apply the VR vendor-specific penetration test corresponding to the identified characteristics. The computer-based system can further comprise a communication interface and a communication connection connecting the communication interface to the VR system. The processor can be configured to detect the communication connection of the communication interface to the VR system. The machine learning module, responsive to the detection of the communication connection, can determine the VR system parameters, can identify the characteristics, and can perform the VR vendor-specific penetration test.

The communication connection can be a physical wired connection. The communication connection can be associated with a plurality of connection settings. The machine learning module, responsive to the plurality of connection settings, can identify vulnerabilities of the VR system associated with the communication connection. The assessment report can include the identified vulnerabilities. The machine learning module can comprise a neural network including a plurality of nodes configured in a plurality of layers, and configured to classify the VR system from the VR system parameters by identifying the characteristics of the VR system. The VR system parameters can specify at least one of a device driver, a file system, and a medium access control (MAC) address, and the identified characteristics can specify at least one of a VR vendor, a VR module, an operating system, and an installed application associated with the VR system. The computer-based system can further comprise an output device including a graphic user interface (GUI) configured to display the assessment report.

In another implementation, a computer-based method comprises detecting a communication connection between an assessment system and a virtual reality (VR) system, receiving VR system parameters at the assessment system from the VR system through the communication connection, identifying characteristics of the VR system using a machine learning module, thereby identifying the VR system from the characteristics, performing a predefined VR vendor-specific penetration test on the identified VR system, generating penetration test results, and generating and outputting an assessment report on the VR system from the penetration test results.

The computer-based method can further comprise storing a plurality of predefined VR vendor-specific test cases in a memory, and training the machine learning module to identify the characteristics of the VR system from the VR system parameters using the plurality of predefined VR vendor-specific test cases. The machine learning module can be configured to automatically identify characteristics of the VR system from the VR system parameters, and to automatically apply the VR vendor-specific penetration test corresponding to the identified characteristics. The computer-based method can further comprise connecting a communication connection to the VR system, detecting the communication connection to the VR system, and responsive to the detection of the communication connection, performing the steps of receiving the VR system parameters, identifying the characteristics, and performing the VR vendor-specific penetration test. The computer-based method can further comprise receiving a plurality of connection settings associated with the communication connection, and identifies vulnerabilities of the VR system associated with the communication connection using the machine learning module, wherein the generating and outputting of the assessment report can include the identified vulnerabilities. The VR system parameters can specify at least one of a device driver, a file system, and a medium access control (MAC) address, and the identified characteristics can specify at least one of a VR vendor, a VR module, an operating system, and an installed application associated with the VR system.

Any combinations of the various embodiments, implementations, and examples disclosed herein can be used in a further implementation, consistent with the disclosure. These and other aspects and features can be appreciated from the following description of certain implementations presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments and implementations consistent with the teachings included in the present disclosure are directed to a system 100 and method 500 configured to perform penetration testing of VR systems using machine learning.

Figure 1:
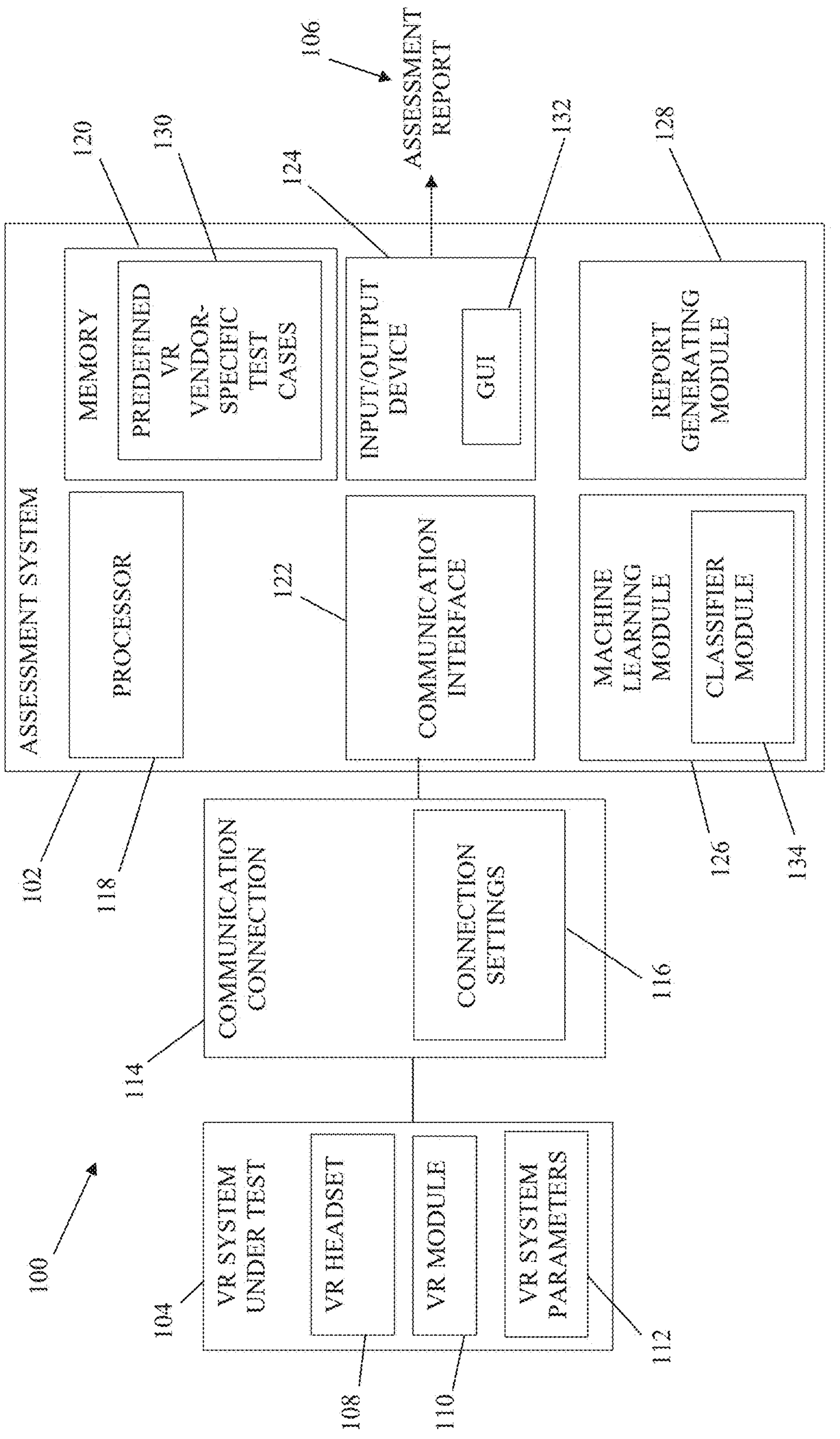
FIG. 1 is a schematic of a system, according to an implementation.

Referring to FIG. 1, in an implementation consistent with the invention, the system 100 includes an assessment system 102 or sub-system operatively connected to a VR system 104 under test, with the assessment system 102 configured to generate and output an assessment report 106 indicating the results of the penetration testing of the VR system 104 under test. In one implementation, the VR system 104 includes a VR headset 108, a VR module 110, and VR system parameters 112. In another implementation, the VR system 104 includes VR gloves or other accessories allowing a user to operate the VR system 104 in conjunction with the VR headset 108. In an implementation consistent with the invention, the VR module 110 includes hardware or software or a combination of hardware or software to implement a VR application, allowing the user to engage in a VR environment. For example, the VR system 104 is implemented using a VR headset 108 and a VR module 110 compatible with the ANDROID operating system publicly available from GOOGLE LLC. In another example, the VR system 104 is implemented using a VR headset 108 and a VR module 110 compatible with the IOS operating system publicly available from APPLE CORPORATION. In a further example, the VR system 104 is implemented using a VR headset 108 and a VR module 110 compatible with any known operating system configured to implement VR applications.

In one implementation, the VR module 110 operates VR software written in the Virtual Reality Modeling Language or the Virtual Reality Markup Language (VRML). In another implementation, the VR module 110 operates VR software written in any known programming language configured to operate the VR system 104 for use by a user in a VR environment. In an implementation consistent with the invention, the VR system 104 includes a memory configured to store the VR system parameters 112. For example, the VR system parameters 112 include device drivers, file systems, and medium access control (MAC) addresses associated with the VR system 104 and its components 108, 110.

The communication connection 114 operatively connects the assessment system 102 to the VR system 104 through a known connection device. In an implementation consistent with the invention, the communication connection 114 includes a physical wired connection. For example, the communication connection 114 is a Universal Serial Bus (USB) compatible cable. The USB compatible cable is a type B USB cable, a type C USB cale, or any known USB compatible device. In another example, the communication connection 114 includes any known physical wired connection between the assessment system 102 to the VR system 104. In another implementation, the communication connection 114 is a wireless connection of the assessment system 102 to the VR system 104. In a further implementation, the communication connection 114 is a hybrid of a wired connection and a wireless connection of the assessment system 102 to the VR system 104.

In another implementation, the communication connection 114 is a network. For example, the network is the Internet. In another example, the network is an internal network or intranet of an organization. In a further example, the network is a heterogeneous or hybrid network including the Internet and the intranet. The communication connection 114 is associated with connection settings 116 specifying the operating parameters and other functionality of the communication connection 114. For example, the communication settings 116 include network protocols, any encryption algorithms encrypting the communications conveyed by the communication connection 114, and network traffic parameters. In an implementation, the communication settings 116 are stored in a memory of the communication connection 114.

The assessment system 102 includes a hardware-based processor 118, a memory 12 configured to store instructions and connected to the hardware-based processor 118 to provide the instructions to the hardware-based processor 118, a communication interface 122, an input/output device 124, and a set of modules 126, 128 configured to implement the instructions provided to the hardware-based processor 118. The set of modules 126, 128 includes a machine learning (ML) module 126 configured to apply machine learning algorithms, and a report generating module 128 configured to generate the assessment report 106. For example, the assessment system 102 is implemented on a laptop computer, allowing the assessment system 102 to be portable and easily connected to a VR system 104 under test, such as in the field. In another example, a kit is provided including a case, such as a hard case or briefcase, configured and dimensioned to store the laptop including the assessment system 102 as well as the communication connection 112, such as a USB cable. In a further example, the assessment system 102 is implemented on a relatively small single-board computer (SBC) such as the RASBERRY PI devices publicly available from the RASBERRY PI LTD.

The memory 120 stores predefined VR vendor specific test cases 130 configured to evaluate the VR system 104 under test. The communication interface 122 is configured to transmit and receive data to and from the VR system 104, respectively, through the communication connection 114. In an implementation consistent with the invention, the input/output device 124 includes a display or monitor configured to display the assessment report 106 and other information to a user through a graphic user interface (GUI) 132. The machine learning module 126 includes a classifier module 134 which is described in greater detail below. In another implementation, the input/output device 124 includes a hardcopy printer configured to output a hardcopy printout of the assessment report 106 to the user.

Figure 2:
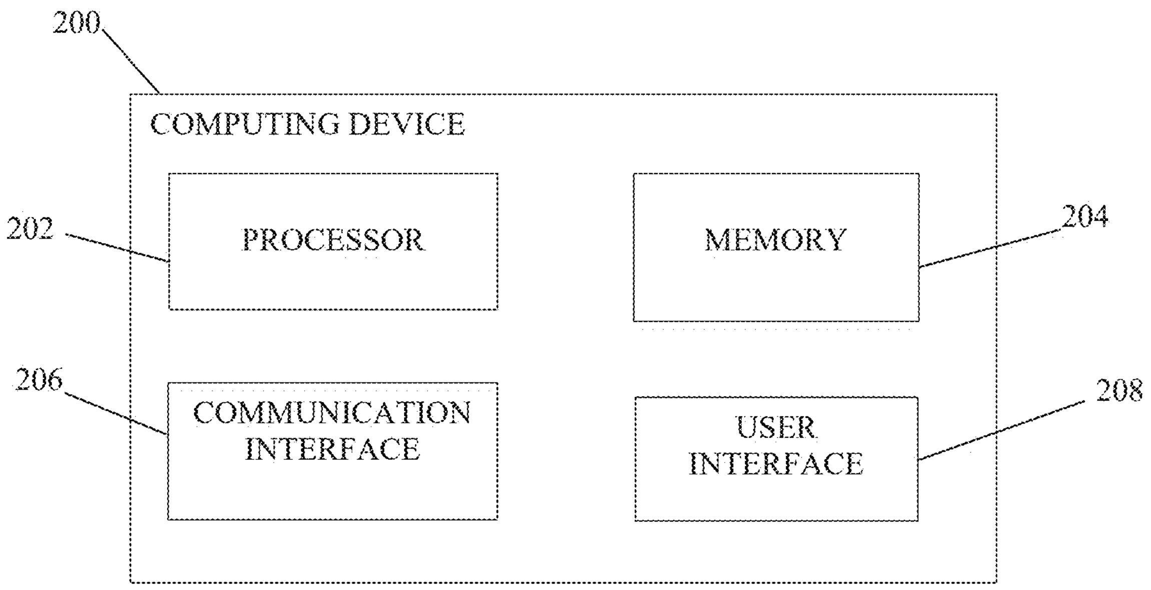
FIG. 2 is a schematic of a computing device used in the implementation.

FIG. 2 illustrates a schematic of a computing device 200 including a processor 202 having code therein, a memory 204, and a communication interface 206. Optionally, the computing device 200 can include a user interface 208, such as an input device, an output device, or an input/output device. The processor 202, the memory 204, the communication interface 206, and the user interface 208 are operatively connected to each other via any known connections, such as a system bus, a network, etc. Any component, combination of components, and modules of the system 100 in FIG. 1 can be implemented by a respective computing device 200. For example, each of the processor 118, the memory 120, the communication interface 122, the input/output device 124, the machine learning module 126, the report generating module 128, the GUI 132, and the classifier module 134 shown in FIG. 1 can be implemented by a respective computing device 200 shown in FIG. 2 and described below.

It is to be understood that the computing device 200 can include different components. Alternatively, the computing device 200 can include additional components. In another alternative implementation, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can be a hardware-based processor implementing a system, a sub-system, or a module. The processor 202 can include one or more general-purpose processors. Alternatively, the processor 202 can include one or more special-purpose processors. The processor 202 can be integrated in whole or in part with the memory 204, the communication interface 206, and the user interface 208. In another alternative implementation, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative implementation, the processor 202 can include a plurality of nodes or artificial neurons configured as an artificial neural network. The processor 202 can be configured to implement any known machine learning (ML) based devices, any known artificial intelligence (AI) based devices, and any known artificial neural networks, including a convolutional neural network (CNN).

The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 202 can be stored in a memory internal to the processor 202. The code can be instructions implemented in hardware. Alternatively, the code can be instructions implemented in software. The instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative implementation, the instructions are executable by the processor 202 to cause the computing device 200 to execute an artificial neural network. The processor 202 can be implemented using hardware or software, such as the code. The processor 202 can implement a system, a subsystem, or a module, as described herein.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol.

The user interface 208 can be any known device configured to perform user input and output functions. The user interface 208 can be configured to receive an input from a user. Alternatively, the user interface 208 can be configured to output information to the user. The user interface 208 can be a computer monitor, a television, a loudspeaker, a computer speaker, or any other known device operatively connected to the computing device 200 and configured to output information to the user. A user input can be received through the user interface 208 implementing a keyboard, a mouse, or any other known device operatively connected to the computing device 200 to input information from the user. Alternatively, the user interface 208 can be implemented by any known touchscreen. The computing device 200 can include a server, a personal computer, a laptop, a smartphone, or a tablet.

Figure 3:
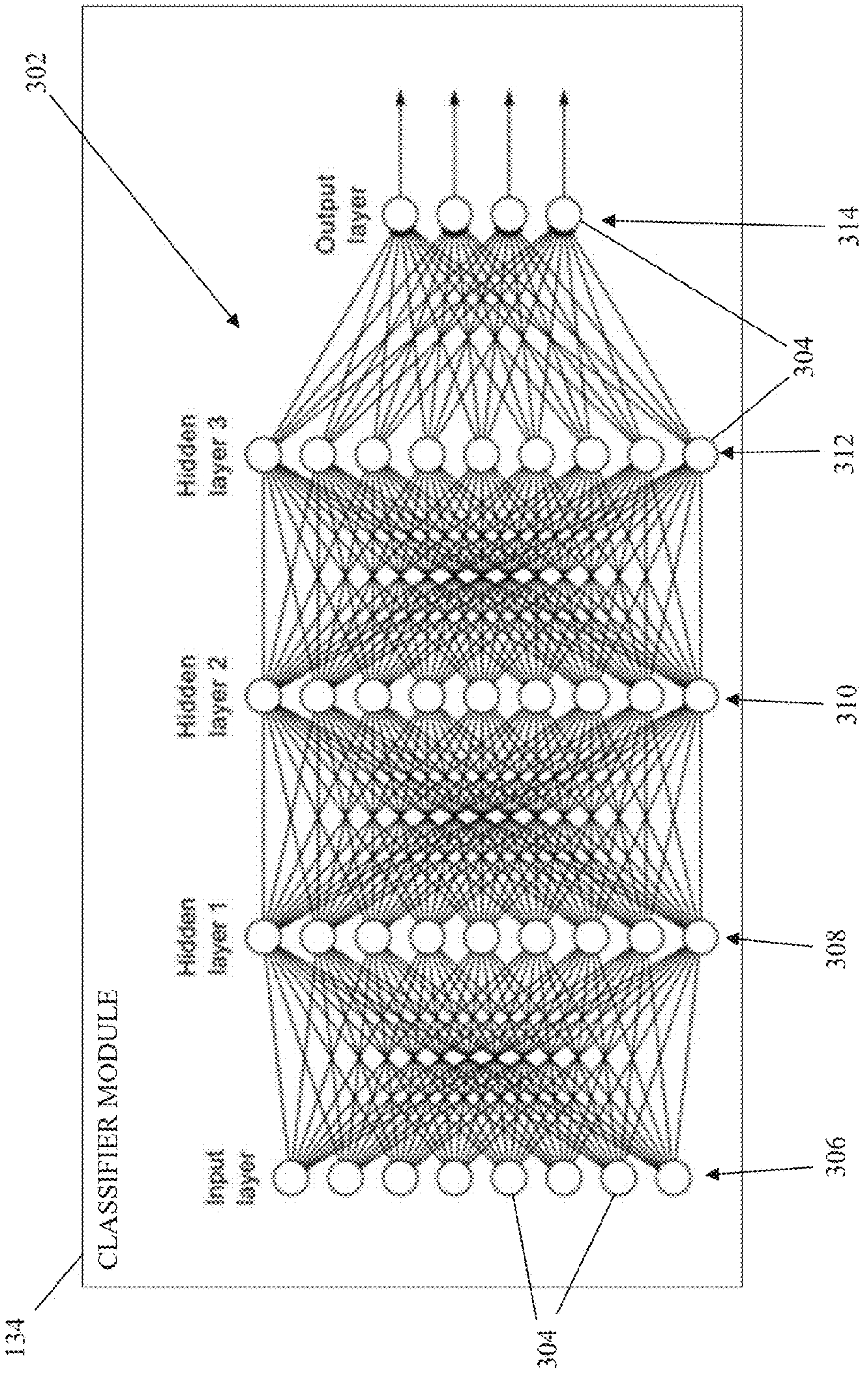
FIG. 3 is a schematic of a classifier module of the system of FIG. 1 implementing a neural network.

Referring to FIGS. 1 and 3, in an implementation consistent with the invention, the classifier module 134 of the machine learning module 126 includes a neural network 302 including a plurality of nodes 304 or artificial neural neurons arranged in a plurality of layers 306-314. The plurality of layers 306-314 include an input layer 306, at least one hidden layer 308-312, and an output layer 314. The neural network 302 receives the VR system parameters 112, including device drivers, file systems, and medium access control (MAC) addresses, at the input layer 306, and generates an output at the output layer 314. The generated output classifies the VR system 104 to identify a VR vendor of the VR system 104, the VR module 110, and the operating system and installed applications of the VR system 104. For example, the installed applications are default installed applications executed by the VR system 104 to provide the VR environment to a user.

In another implementation, the classifier module 134 includes a support vector machine (SVM) configured to classify and identify the VR vendor of the VR system 104, the VR module 110, and the operating system and installed applications of the VR system 104 from the VR system parameters 112, including device drivers, file systems, and MAC addresses. In a further implementation, the classifier module 134 includes any known machine learning processors and algorithms configured to classify and identify the VR vendor of the VR system 104, the VR module 110, and the operating system and installed applications of the VR system 104 from the VR system parameters 112, including device drivers, file systems, and MAC addresses.

Figure 4:
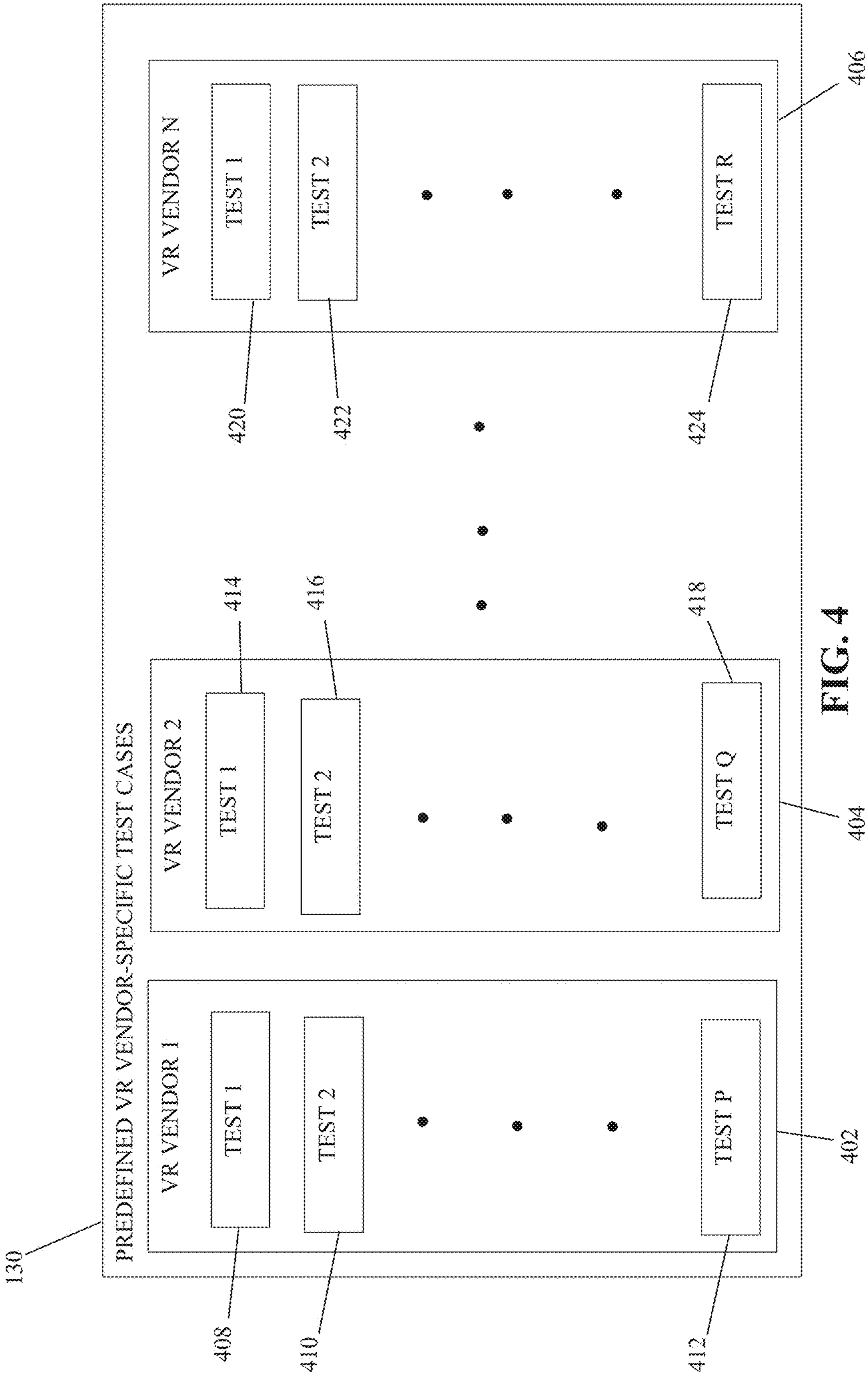
FIG. 4 illustrates a set of predefined VR vendor-specific test cases.

In an implementation consistent with the invention, the classifier module 134 is trained using the predefined VR vendor-specific test cases 130, as shown in FIGS. 1 and 4. Referring to FIG. 4, each of a plurality of VR vendors 402, 404, 406 are associated with a plurality of tests 408-424, such as penetration tests, with varying traffic behaviors and different default applications based on the VR vendor in order to account for the different VR environments. Each of the VR vendor-specific test cases 408-424 is tailored to a VR vendor system or device environment. For example, the VR vendors 402, 404, 406 are labeled “VR Vendor 1”, “VR Vendor 2”, through “VR vendor N”, in which N is an integer greater than one. The VR vendor 402 is associated with tests 408-412 labeled “Test 1”, “Test 2”, through “Test P”, respectively, in which P is an integer greater than one. The VR vendor 404 is associated with tests 414-418 labeled “Test 1”, “Test 2”, through “Test Q”, respectively, in which Q is an integer greater than one. The VR vendor 406 is associated with tests 420-424 labeled “Test 1”, “Test 2”, through “Test R”, in which R is an integer greater than one.

For example, a test 416 associated with VR vendor 404 is configured to determine installed default applications on an ANDROID-base VR Headset by performing input validation testing covering a wide scope of possible cybersecurity attacks including the known Open Web Application Security Project (OWASP) Top 10 Mobile and Web attacks. The OWASP Top 10 Mobile and Web attacks for the year 2024 include M1: Improper Credential Usage, M2: Inadequate Supply Chain Security, M3: Insecure Authentication/Authorization, M4: Insufficient Input/Output Validation, M5: Insecure Communication, M6: Inadequate Privacy Controls, M7: Insufficient Binary Protections, M8: Security Misconfiguration, M9: Insecure Data Storage, and M10: Insufficient Cryptography.

In an alternative implementation, the machine learning module 126, including the classifier module 134, is also trained and configured to check if any insecure network protocols are utilized in the communications through the communication connection 112. The machine learning module 126, including the classifier module 134, is further trained and configured to check and analyze for weak encryption algorithms employed by the VR system 104 or the communication connection 114. In addition, the machine learning module 126, including the classifier module 134, is also trained to analyze VR network traffic to and from the VR system 104 to monitor external cloud traffic and based on the traffic behavior and the identified VR module 110. Moreover, the machine learning module 126, including the classifier module 134, is also trained to input validation checks on applications executed by the VR system 104. Furthermore, the machine learning module 126, including the classifier module 134, is trained or configured to identify if the VR network traffic is considered normal behavior or if the VR network traffic will pose a cybersecurity risk.

In an implementation, the training of the classifier module 134 from the predefined VR vendor-specific test cases 130 is performed using supervised learning. In another implementation, the training is performed using any known machine learning technique. Once the classifier module 134 is trained, the communication interface 122 of the assessment system 102 is operatively connected to the VR system 104 under test using the communication connection 114. For example, the communication connection 114 is physically plugged into a port of the VR system 104. In response to communication signals from the communication interface 122, the processor 118 detects the connection of the VR system 104 to the assessment system 102 using a known detection technique. For example, the processor 118 is configured to detect a connection to the VR system 104 using a handshaking communication protocol or an acknowledgement protocol.

The assessment system 102 then identifies the VR vendor of the VR system 104, the VR module 110, and the operating system and installed applications of the VR system 104. After the identification, the assessment system 102 automatically applies the VR vendor-specific tests associated with the identified VR system 104, the VR module 110, and the operating system and installed applications of the VR system 104. For example, upon identification that the VR system 104 is associated with the VR vendor 404 shown in FIG. 4, the assessment system 102 applies the tests 414, 416, 418 to the identified VR system 104, and obtains penetration test results associated with the identified VR system 104.

In another implementation, the assessment system 102 receives the connection settings 116 associated with communication connection 114 between the assessment system 102 and the VR system 104 under test. For example, such connection settings 116 specify the operating parameters and other functionality of the communication connection 114, such as network protocols, any encryption algorithms encrypting the communications conveyed by the communication connection 114, and network traffic parameters. The machine learning module 126, including the trained classifier module 134, processes such connection settings 116 to determine vulnerabilities of the VR system 104 with the vulnerabilities associated with the communication connection 114 to the VR system 104.

Once the machine learning module 126, including the trained classifier module 134, determines the penetration test results associated with the VR system 104 and its applications, and optionally the vulnerabilities of the VR system 104 in relation to the communication connection 114, the report generating module 128 generates the assessment report 106 of all the discovered cybersecurity issues along with risk ratings of each of the cybersecurity issues. In one implementation, the assessment report 106 is formatted by the report generating module 128 for display or printout by the input/output device 124. For example, the input/output device 124 generates and outputs the assessment report 106 on the GUI 132 for viewing and manipulation by a user, such as to email the assessment report 106 to someone, to store the assessment report 106, to annotate the assessment report 106, or to print the assessment report 106. In another example, the input/output device 124 includes a web browser, and the report generating module 128 formats the assessment report 106 in hypertext markup language (HTML) for display on the browser, and for viewing and manipulation of the assessment report 106 by the user, such as to email the assessment report 106 to someone, to store the assessment report 106, to annotate the assessment report 106, or to print the assessment report 106.

In a further example, the assessment report 106 includes an alert, a message, or a notification to a user, such as a system administrator or a cybersecurity expert, of the cybersecurity issues and risks of the VR system 104, of any insecure network protocols, any weak encryption algorithms employed by the VR system 104 or the communication connection 114, and whether the VR network traffic is considered normal behavior or if the VR network traffic will pose a cybersecurity risk.

Figure 5A:
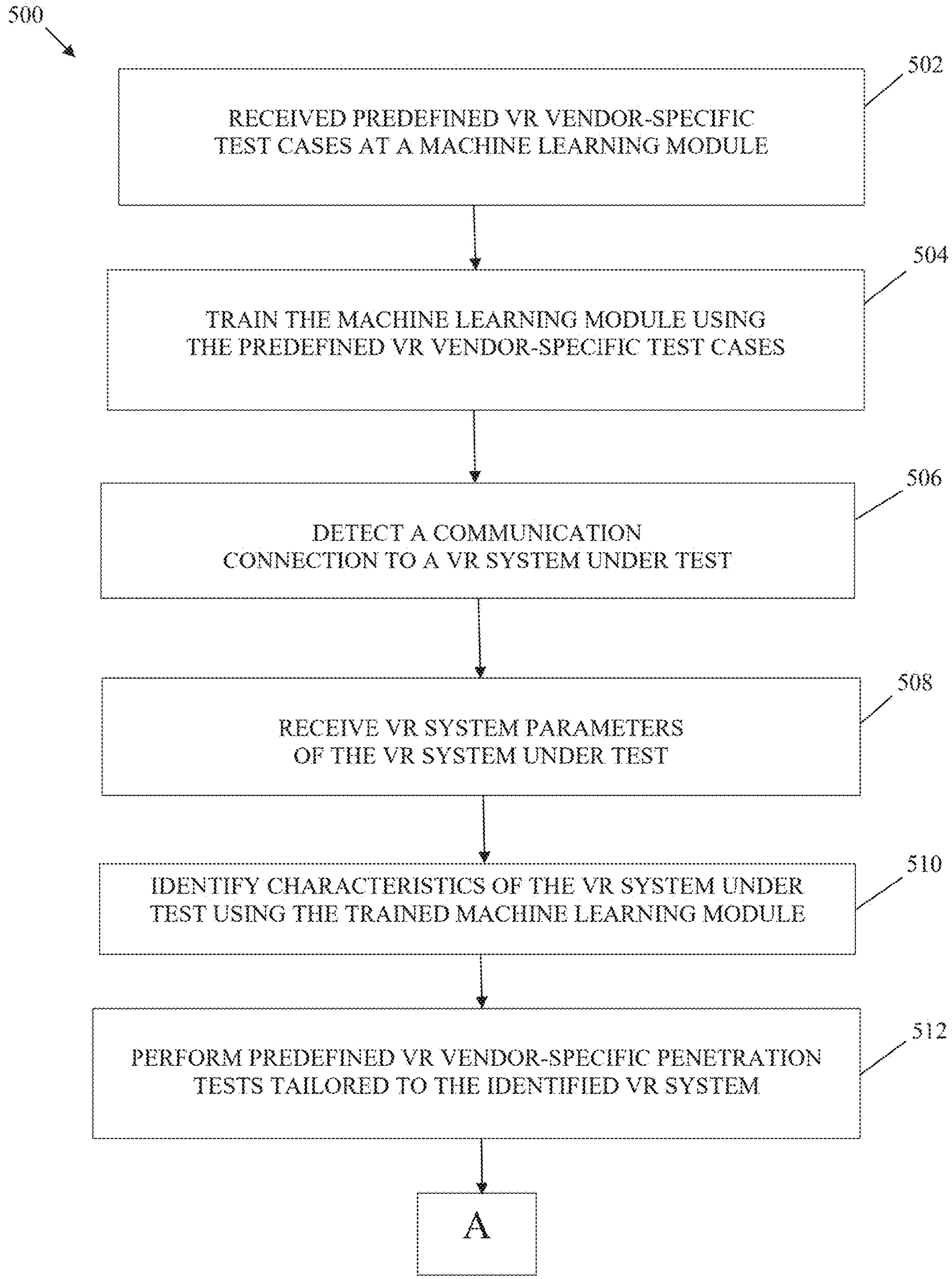
FIGS. 5A-5B are flowcharts of operation of a method implementing the system of FIG. 1.
Figure 5B:
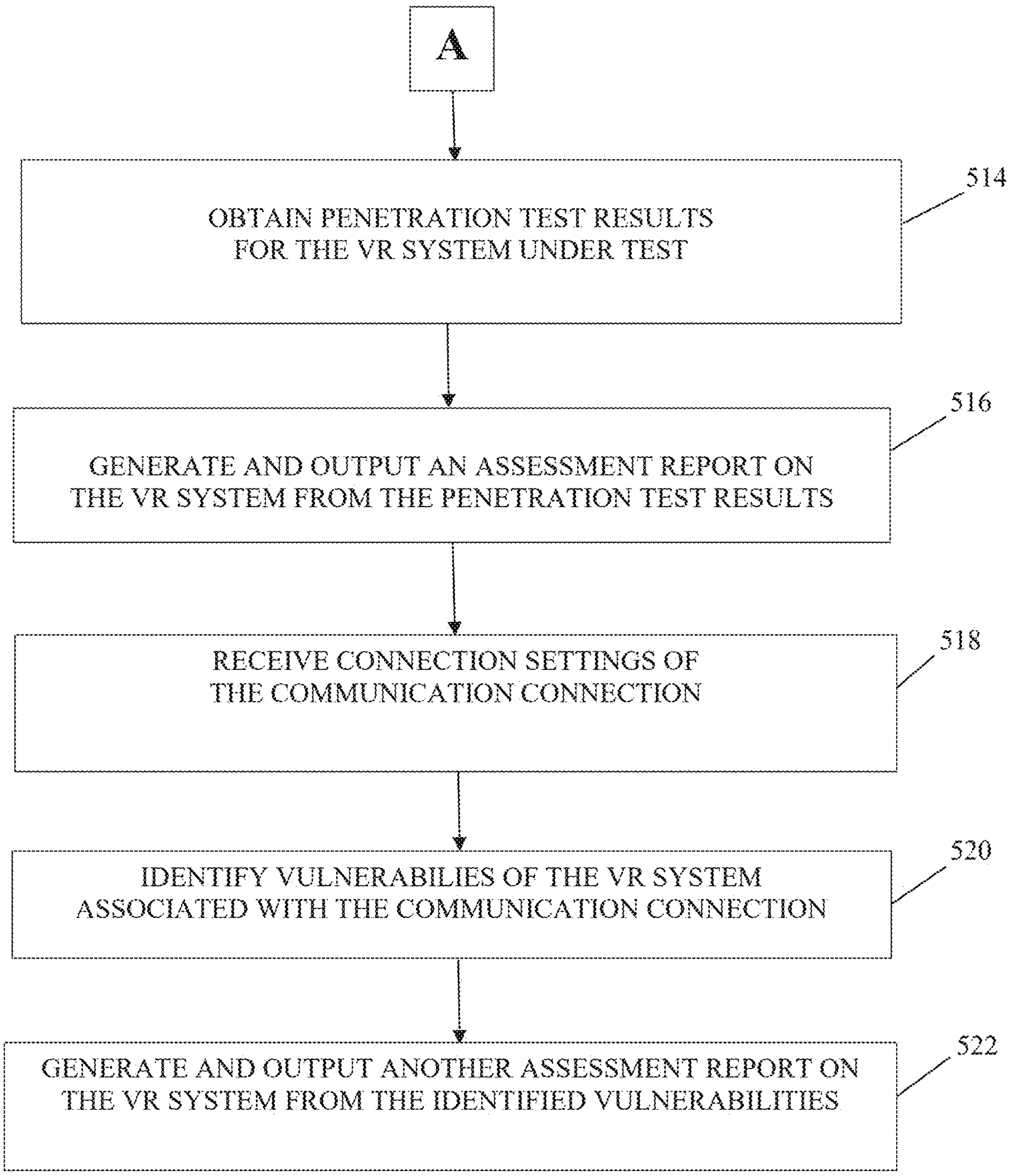

Referring to FIGS. 5A-5B, a computer-based method 500 includes receiving the predefined VR vendor-specific test cases 130 at the machine learning module 126 in step 502, and training the machine learning module 126 using the predefined VR vendor-specific test cases 130 in step 504. The method 500 then detects a communication connection 114 of the assessment system 102 to the VR system 104 under test in step 506, receives VR system parameters 112 of the VR system 104 under test in step 508, and identifies characteristics of the VR system 104 under test using the trained machine learning module 126 in step 510. The method 500 then performs predefined VR vendor-specific penetration tests tailored to the identified VR system 104 in step 512, and obtains penetration results for the VR system 104 in step 514. The method 500 then generates and outputs an assessment report 106 on the VR system 104 from the penetration test results in step 516.

In another implementation, the method 500 receives connection settings 116 of the communication connection 114 in step 518, identifies vulnerabilities of the VR system 104 associated with the communication connection 114 in step 520, and generating and outputting another assessment report on the VR system 104 from the identified vulnerabilities in step 522. In an alternative implementation, the identified vulnerabilities of the VR system 104 associated with the communication connection 114 are included with assessment report 106 generated from the penetration results for the VR system 104.

In an implementation consistent with the invention, a non-transitory computer-readable storage medium stores instructions executable by the processor to 102. The instructions include the steps 502-522 of the method 500 shown in FIGS. 5A-5B. It is understood that the system 100 and method 500 perform such penetration testing and vulnerability assessment on not just VR systems but also augmented reality (AR) systems, mixed reality (MR) systems, extended reality systems, and other known computer-mediated reality systems.

Accordingly, by automating the identification of the VR system 104 under test, and by automatically applying the appropriate penetration tests tailored to the identified VR system 104, the system 100 and method 500 efficiently and accurately determine all cybersecurity issues of the VR system 104 under test along with the risk ratings of the cybersecurity issues, without the need of a cybersecurity expert and the need for such a cybersecurity expert to tediously prepare and wear the VR system 104. In addition, the automated penetration testing and vulnerability assessment are performed on the applications as installed on the VR system 104, and so the system 100 and method 500 generate the assessment report 106 presenting a full risk assessment of the deployed applications in the VR system 104.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be implemented on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments, implementations, or arrangements.

The terminology used herein is for the purpose of describing particular implementations only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to implementations of the disclosure without departing from the essential scope thereof. Therefore, it is intended that the invention not be limited to the particular implementations disclosed, or to the best mode contemplated for carrying out this invention, but that the invention will include all implementations falling within the scope of the appended claims.

The subject matter described above is provided by way of illustration only and should not be construed as limiting. Various modifications and changes can be made to the subject matter described herein without following the example embodiments, implementations, and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-based system configured to perform penetration testing on a virtual reality (VR) system, comprising:

a hardware-based processor;

a memory configured to store instructions, and connected to the hardware-based processor to provide the instructions to the hardware-based processor;

a set of modules configured to implement the instructions provided to the hardware-based processor, the set of modules including:

a machine learning module configured to receive VR system parameters of the VR system, wherein the VR system parameters are selected from the group consisting of: a VR-related device driver, a VR-related file system, and a medium access control (MAC) address associated with the VR system, to identify characteristics of the VR system from the VR system parameters thereby identifying the VR system, and to perform a VR vendor-specific penetration test corresponding to the identified characteristics, thereby generating penetration test results associated with the VR system; and a report generating module configured to generate and output an assessment report of the VR system using the penetration test results.

2. The computer-based system of claim 1, wherein the memory stores a plurality of predefined VR vendor-specific test cases, and wherein the machine learning module is trained to identify the characteristics of the VR system from the VR system parameters using the plurality of predefined VR vendor-specific test cases.

3. The computer-based system of claim 1, wherein the machine learning module is configured to automatically identify characteristics of the VR system from the VR system parameters, and to automatically apply the VR vendor-specific penetration test corresponding to the identified characteristics.

4. The computer-based system of claim 1, further comprising:

a communication interface; and a communication connection connecting the communication interface to the VR system, wherein the processor is configured to detect the communication connection of the communication interface to the VR system, and wherein the machine learning module, responsive to the detection of the communication connection, determines the VR system parameters, identifies the characteristics, and performs the VR vendor-specific penetration test.

5. The computer-based system of claim 3, wherein the communication connection is a physical wired connection.

6. The computer-based system of claim 3, wherein the communication connection is associated with a plurality of connection settings, wherein the machine learning module, responsive to the plurality of connection settings, identifies vulnerabilities of the VR system associated with the communication connection, and wherein the assessment report includes the identified vulnerabilities.

7. The computer-based system of claim 1, wherein the machine learning module comprises:

a neural network including a plurality of nodes configured in a plurality of layers, and configured to classify the VR system from the VR system parameters by identifying the characteristics of the VR system.

8. The computer-based system of claim 1, wherein the identified characteristics specify at least one of a VR vendor, a VR module, an operating system, and an installed application associated with the VR system.

9. The computer-based system of claim 1, further comprising:

an output device including a graphic user interface (GUI) configured to display the assessment report.

10. A computer-based method, comprising:

detecting a communication connection between an assessment system and a virtual reality (VR) system;

receiving VR system parameters of the VR system at the assessment system from the VR system through the communication connection, wherein the VR system parameters are selected from the group consisting of: a VR-related device driver, a VR-related file system, and a medium access control (MAC) address associated with the VR system;

identifying characteristics of the VR system from the VR system parameters using a machine learning module, thereby identifying the VR system from the characteristics;

performing a predefined VR vendor-specific penetration test on the identified VR system;

generating penetration test results; and generating and outputting an assessment report on the VR system from the penetration test results.

11. The computer-based method of claim 10, further comprising:

storing a plurality of predefined VR vendor-specific test cases in a memory; and training the machine learning module to identify the characteristics of the VR system from the VR system parameters using the plurality of predefined VR vendor-specific test cases.

12. The computer-based method of claim 10, wherein the machine learning module is configured to automatically identify characteristics of the VR system from the VR system parameters, and to automatically apply the VR vendor-specific penetration test corresponding to the identified characteristics.

13. The computer-based method of claim 10, further comprising:

connecting a communication connection to the VR system;

detecting the communication connection to the VR system;

responsive to the detection of the communication connection, performing the steps of receiving the VR system parameters, identifying the characteristics, and performing the VR vendor-specific penetration test.

14. The computer-based method of claim 13, further comprising:

receiving a plurality of connection settings associated with the communication connection; and identifies vulnerabilities of the VR system associated with the communication connection using the machine learning module, wherein the generating and outputting of the assessment report includes the identified vulnerabilities.

15. The computer-based method of claim 10, wherein the identified characteristics specify at least one of a VR vendor, a VR module, an operating system, and an installed application associated with the VR system.

* * * * *